United States Patent Office 3,403,891
Patented Oct. 1, 1968

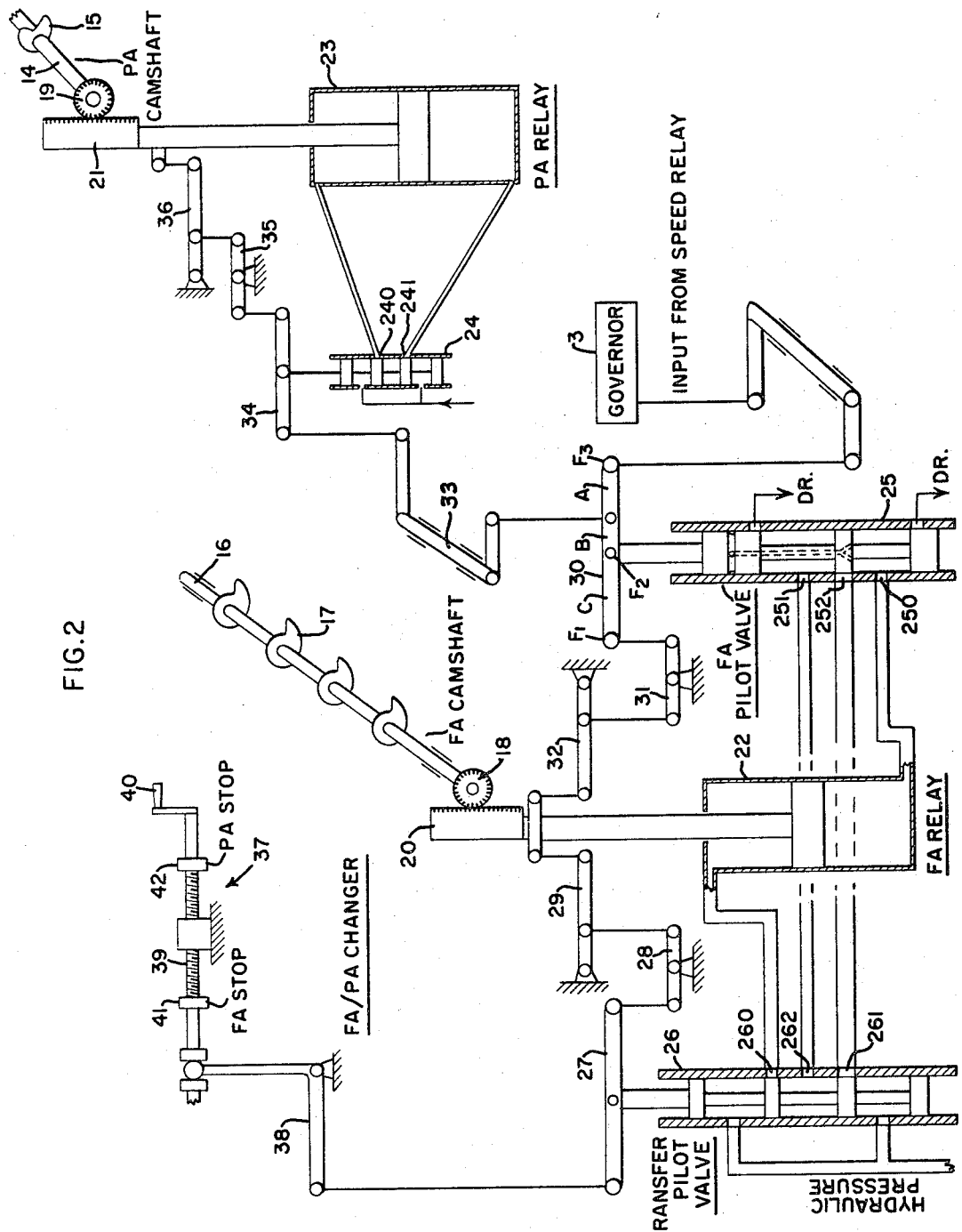

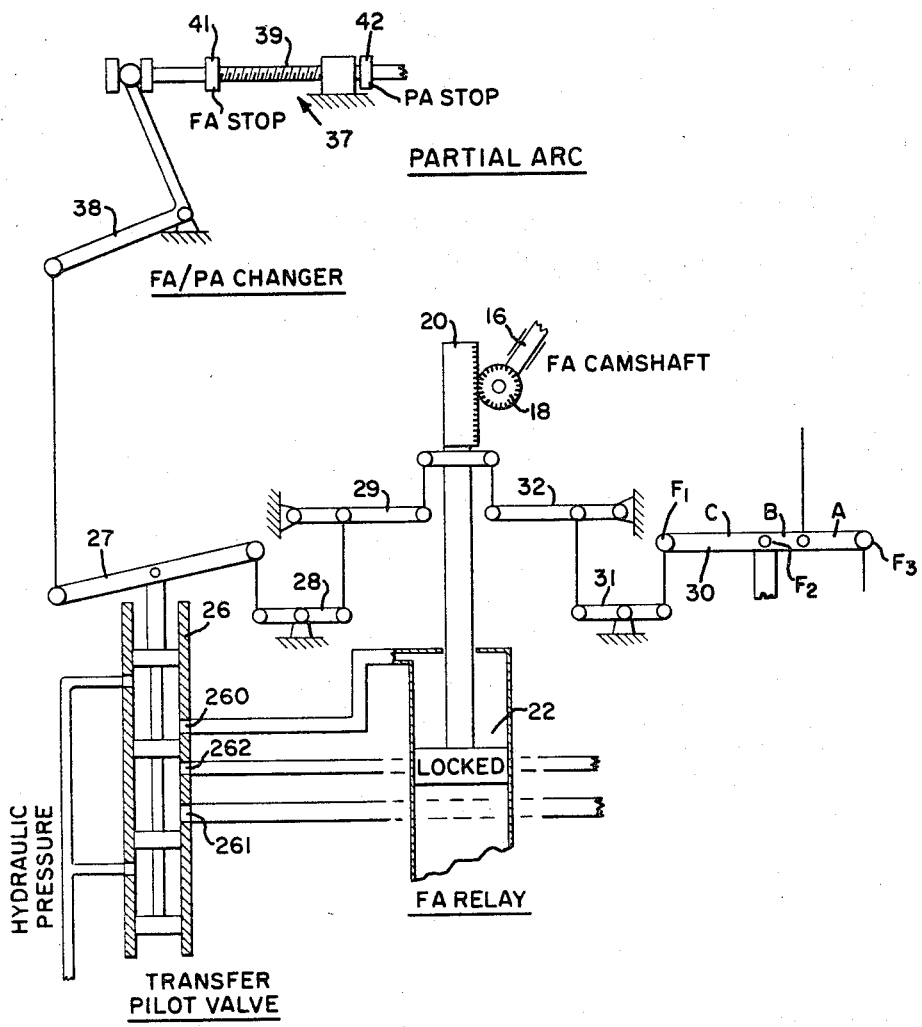

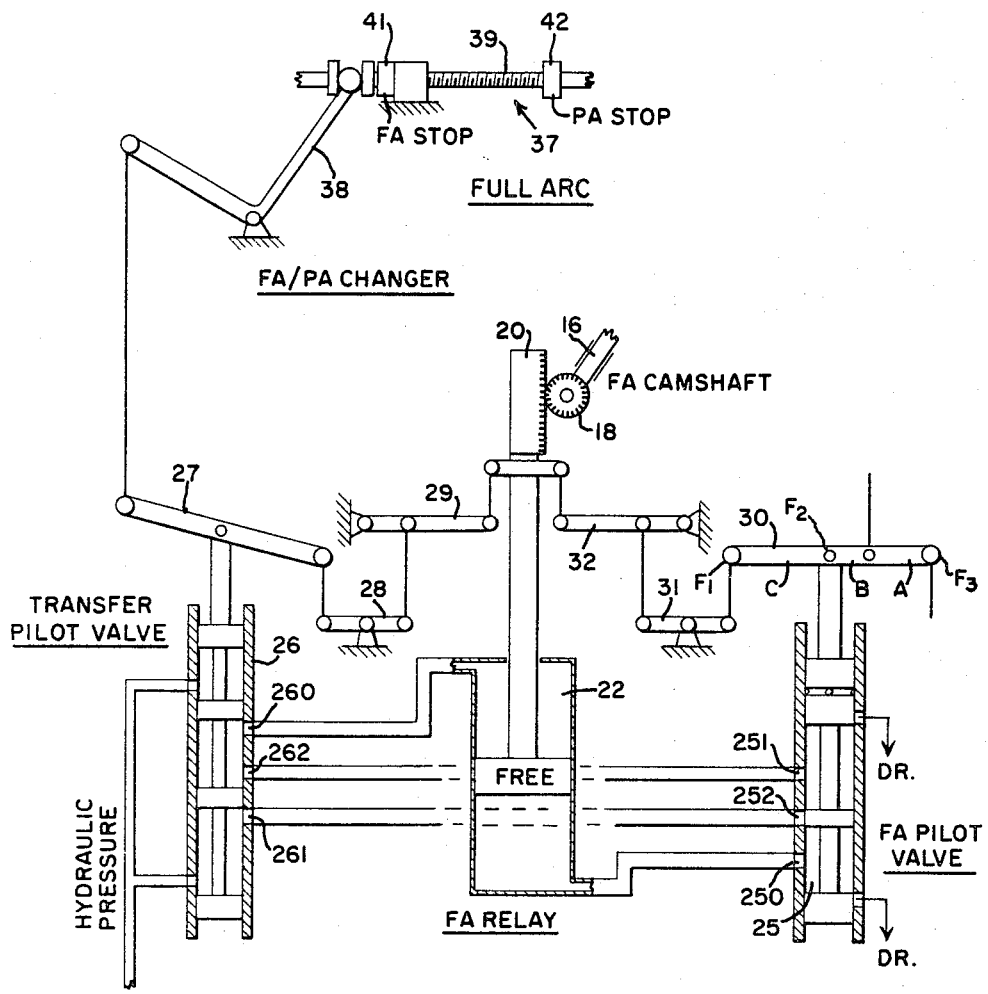

3,403,891
FULL ARC/PARTIAL ARC ADMISSION
USING CONTROL VALVES
Lloyd H. Johnson and Robert L. Carson, Scotia, N.Y.,
assignors to General Electric Company, a corporation
of New York
Filed Jan. 12, 1967, Ser. No. 608,857
5 Claims. (Cl. 253—59)

ABSTRACT OF THE DISCLOSURE

A mechanical-hydraulic system for the control of steam admission to a turbine in either "full arc" or "partial arc" mode of operation at any load level.

Background of the invention

This invention relates generally to steam turbine mechanical-hydraulic control systems of the type where hydraulic amplifiers position a number of control valves admitting steam to the turbine in response to valve positioning signals in order to control the speed or load on the turbine. More particularly the invention relates to the transfer back and forth between "full-arc" and "partial-arc" operation in a steam turbine.

A related invention of an analagous electro-hydraulic system is disclosed in an application in the names of M. A. Eggenberger, P. G. Ipsen, and P. A. Troutman, No. 608,858 filed concurrently herewith and assigned to the present assignee.

Partial arc control of the steam flow to the first stage of a steam turbine was devised many years ago and is widely used because it has the advantage of providing a significant improvement in turbine heat rate at partial loads, as contrasted with full arc control. However, the use of partial arc control results in higher thermal stresses in the turbine under most operating transients than would exist if full arc control were used. This arises for two principal reasons. First, in starting a turbine with partial arc control, steam is admitted to only a portion of the circumference of the first stage with the result that the inlet portion of the turbine is heated unevenly and in steps, rather than uniformly. Second, where a turbine is operating under load, the change in temperature in the first stage shell for a given load change is appreciably greater with partial arc control than it is with full arc control.

Thus, it is obvious that the ability to transfer back and forth between partial-arc and full arc control at any load would afford the opportunity to reduce thermal stresses on the turbine without giving up the efficiency advantages of partial arc control. For example, with such an arrangement, it would be normal practice to start and load under full arc control; then where the desired load was reached, the transfer would be made to partial arc control at a rate which would result in reasonable thermal stresses. For a large reduction in load after sustained operation at a high load, the control would be switched to the full arc mode as load was being reduced in order to minimize the change in first stage shell temperature. For cases where the turbine had been operating for some time at light load on partial arc control and a large load increase was scheduled, a transfer to full arc control would be made well ahead of the time of the load increase so as to accomplish a portion of the first stage temperature increase; then the temperature change associated with the load change would be smaller and could be made more rapidly without exceeding allowable thermal stresses.

In the prior art, it is known to operate steam turbines on partial arc and full arc admission. However and as shown in U.S. Patent 3,027,137—Eggenberger, assigned to the present assignee, the partial arc admission is controlled by the "control valves." Full arc admission is accomplished by keeping the control valves fully open and controlling by the turbine stop valve which is upstream of the control valves and which is normally used for shutting off all steam flow to the turbine. The control of steam admission is accomplished by employing a bypass arrangement in the seat of the turbine stop valve. Because of physical limitations in this bypass arrangement, it is possible only to operate the turbine at part load (up to approximately 40% load) on this prior art full arc admission mode of operation.

It has also been suggested in the prior art that the control valves alone can be manipulated in two different manners to obtain either partial arc or full arc operation. However, the total flow rate of steam before and after transfer was substantially different and had to be compensated for by readjusting the turbine load setting during transfer.

One object of the invention is to provide an improved mechanical-hydraulic control system for operating on either full arc or partial arc control and accomplishing the transfer therebetween at various load levels with only minor load change.

Another object of the invention is to provide an improved control system for coordinating movements of control valves smoothly when transferring between full arc and partial arc operation.

Accordingly, it is an object of the present invention to provide a dual operation control valve for a steam turbine by which the turbine will operate under the partial arc or full arc modes at any load level and without manual supervision.

Other objects, advantages and features of the present invention will become apparent from the following description of an embodiment thereof when taken in connection with the accompanying drawing.

Summary of the invention

Briefly, the present invention is practiced in one form by a steam turbine control valve system which operates on two different steam admission modes at the selection of an operator. In the "partial arc" admission mode, each of the several control valves is sequentially positioned in response to a signal from one of several cams on a shaft, which cams are rotatably offset from one another to provide sequential signals as their shaft is rotated in response to a speed signal to open or close the valves. In the "full arc" mode, the valves are similarly positioned in response to signals from cams which are all identically mounted on their shaft, which likewise is rotated in response to a speed signal to open or close the valves. The two camshafts control the valves through common linkages, and a full arc-partial arc transfer mechanism enables an operator to transfer control of the linkages from one mode to the other.

Brief description of the drawing

FIG. 2 is a schematic representation of the remaining portion of the full-arc-partial control system,
FIG. 3 shows a portion of the FIG. 2 control system in one operating position,
and
FIG. 4 shows a part of the FIG. 2 control system in another operating position.

Description of the preferred embodiment

Figure 1:
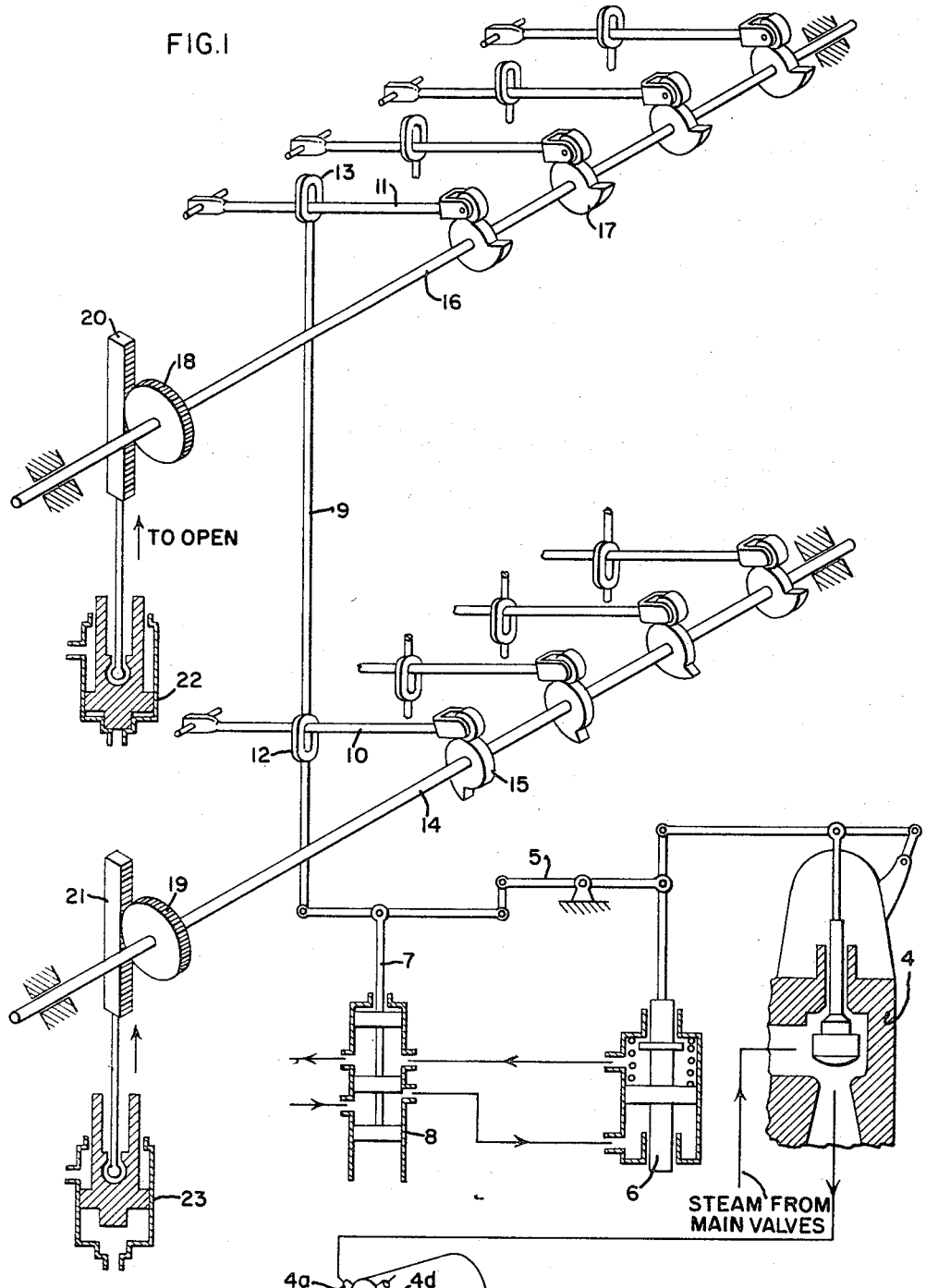
FIG. 1 is a schematic representation of a steam turbine control valve and its associated full arc and partial arc control system.

Referring now to FIG. 1, a high pressure steam turbine is represented at 2 and has four steam admission control valves 4 mounted therearound, each controlling steam to approximately 90° arc portion of the 360° total nozzle circumference. Control valves 4, which may be further designated as 4a, 4b, 4c, and 4d for the individual arc admission control valves, are controlled each by a servomotor 6 which is in turn controlled by a pilot valve 8. A restoring linkage 5 operating between servomotor or relay 6 and pilot valve 8 keeps the pilot valve in the closed, or on port, position during equilibrium conditions. Pilot valve 8 is connected to a suitable source of pressurized hydraulic fluid and a suitable drain, both of which are not shown, and is also operatively connected to servomotor or relay 6 by suitable conduits. Pilot valve 8 is actuated by a valve stem 7 which is in turn actuated by a lift rod or stem 9. Lift rod 9 is operatively connected to two separate cam levers which will be referred to as the partial arc cam lever 10 and the full arc cam lever 11. Cam levers 10 and 11 are operatively connected to lift rod 9 through overrriding devices such as the elongated slots 12 and 13 respectively in the lift rod 9. That is, cam lever 10 moves freely within slot 12 and cam lever 11 moves freely within slot 13. The elongated slots 12 and 13 enable either cam lever 10 or cam lever 11, whichever causes a higher lifting of the lift rod 9, to be in control, by means of stem 7, pilot valve 8 and servomotor 6, of the steam control valves 4. While one or the other of cam levers 10 or 11 is in control, the other cam lever can move freely within its slot without affecting the valve positioning. Cam levers 10 and 11 have suitable means, not shown, biasing them in constant abutment against their respective cams.

It will be understood that the aforementioned rod 9, pilot valve 8, servomotor 6, etc. are all associated with one of the steam admission control valves 4a. There is a similar mecahnical and hydraulic mechanism for each of the valves 4b, 4c, and 4d, which elements are only indicated in FIG. 1 and not shown in their entirety for the sake of clarity.

Partial arc cam shaft 14 has a plurality of cams 15 axially spaced therealong. The number of these cams 15 corresponds to the number of cam levers 10 to be controlled which in turn corresponds to the number of admission valves 4. The several cams 15 on partial arc cam shaft 14 are rotatably offset in a sequential manner for a purpose later to be described.

Full arc cam shaft 16 similarly has a plurality of axially spaced identically oriented cams 17 mounted thereon. A pinion 18 is fixedly mounted on full arc cam shaft 16 and a similar pinion 19 is mounted on partial arc cam shaft 14. Pinion 18 on the full arc cam shaft 16 is actuated by a rack 20, an upward movement of rack 20 corresponding to an upward movement of cam lever 11 in turn corresponding to opening of the steam control valves 4. Similarly, pinion 19 mates with a rack 21, the upward movement of which corresponds to an upward movement of cam lever 10 which in turn corresponds to opening of the admission valves 4.

Rack 20 is connected to and movable with the stem of a double acting full arc servomotor or relay 22. Similarly, rack 21 is connected to the stem of a double acting partial arc servomotor or relay 23.

In FIG. 2, the control systems for the servomotors 22 and 23 are shown. The partial arc servomotor 23 receives hydraulic fluid from partial arc pilot valve 24, and full arc servomotor 22 receives hydraulic fluid from full arc pilot valve 25 and transfer pilot valve 26 acting jointly. The pilot valve positions shown in FIG. 2 may be considered neutral or port positions. That is, that hydraulic fluid being supplied to transfer pilot valve 26 does not communicate through the valve 26 because its lands are covering its ports 260 and 261. Similarly, on partial arc pilot valve 24, ports 240 and 241 are blocked and on full arc pilot valve 25, ports 250 and 251 communicate with dead chambers because port 252 is blocked. Transfer pilot valve 26 and full arc pilot valve 25 are connected in series, and in addition to the ports already mentioned, transfer pilot valve has a port 262 which communicates with port 251 in full arc pilot valve 25, and valve 25 has a port 252 which communicates with port 261 in valve 26.

The valve and servomotor arrangement includes a feedback or restoring mechanism as follows: Pivotally attached to the stem of transfer pilot valve 26 is a lever 27 which in turn is pivotally connected at one end to another lever 28 which in turn is pivotally connected at its opposite end to a lever 29 which is pivoted at its end to the stem of servomotor 20.

A lever 30 is pivotally connected at point $F_2$ to the stem of full arc pilot valve 25. A lever 31 is in turn pivotally connected on one of its ends to lever 30 at point F, and on its other end to a lever 32 which is pivotally connected at its end to the stem of servomotor 20.

Lever 30 is pivotally connected at one end point $F_3$ to the mechanical input signal from governor 3, which is operatively connected to the shaft of turbine 2. At a point on lever 30 intermediate the pivotal points $F_2$ and $F_3$ is a pivotal connection to a rocker shaft 33 which is in turn pivotally connected to a lever 34. Lever 34 is pivotally connected at its center to the stem of partial arc pilot valve 24 and at its other end to a lever 35 which is in turn pivoted at its other end to a second class lever 36 is pivoted at its end to the stem of partial arc servomotor 23.

Operatively connected to link 27 at its end opposite to the pivotal connection with link 28, is an input from a changer mechanism generally indicated at 37. Changer mechanism 37 includes a rocker link 38 pivotted at one end to link 27 and at its other end to a reciprocating actuator screw 39. The actuator screw 39 may be driven by a motor, hand crank, or other means not shown but generally indicated at 40. The actuator screw is movable between two limits known as the full arc stop 41 and the partial arc stop 42.

For purposes of understanding the operation of this invention, link 30 may be thought of as compared of segments A, B and C adding up to the total length of the link.

Operation

The operation of the above-described invention will now be described. First, assume that the full arc-partial arc changer mechanism is on the partial arc stop. Rocker link 38 will be in a downward position causing link 27 and the stem of transfer pilot valve 26 likewise to be in a downward position. In this position, as shown in FIG. 3, port 260 is open and communicates with the hydraulic fluid supply whereas port 261 is blocked from communicating with the hydraulic fluid supply. Accordingly, since hydraulic fluid is supplied to the top of the cylinder but not to the bottom of the cylinder of full arc servomotor 22, the full arc servomotor is locked in its closed position and unable to control full arc camshaft 16. This being the case, point $F_1$ on link 30 becomes a fixed fulcrum for the partial arc mode of operation, and the input from governor 3 produces a signal multiplied by the lever ratio $$\frac{B+C}{A+B+C}$$

which is an input to rocker shaft 33 and lever 34 to the partial arc pilot valve 24, controlling the same. In this manner, the partial arc relay or servomotor 23 can be positioned throughout its stroke to control the steam valves by means of camshaft 14 in a sequential manner from zero to 100% of rated flow.

Assume now that the full arc-partial arc changer mechanism is on the full arc stop 41. This causes rocker link 38 to be raised in turn raising link 27 and the stem of transfer pilot valve 26. In this position, as shown in FIG. 4, the full arc pilot valve 25 is in control of the position of full arc servomotor 22 because ports 260, 261, and 262 of the transfer pilot valve are open and servomotor 22 is operative. (Servomotor 23 also remains operative in this mode of control.) One of the pressure ports in valve 26 communicates with port 261 and therefore with port 252 in pilot valve 25 supplying hydraulic pressure to pilot valve 25 arming the same. It will be apparent that any input move up or down of the stem of pilot valve 25 will result in an opening of port 252 so as to direct pressurized fluid to one side or the other of the piston in full arc servomotor 22. Similarly, any input to pilot valve 25 will allow the opposite side of the piston in servomotor 22 to drain.

Through the corrective or restoring action of linkages 32, 31 and 30, any input to the stem of pilot valve 25 results in a corresponding movement of servomotor 22 which in turn results in a restoring movement to lever 30 which returns pilot valve 25 to the port or equilibrium position. The effect is that the fulcrum point $F_2$ is fixed as a practical matter and is in effect the fulcrum point about which lever 30 acts as a result of the input from speed governor 3 under this full arc mode of operation.

When the full arc pilot valve 25 is in control of the full arc servomotor as just described, it will be apparent that there is a small signal from the speed relay which reaches the partial arc pilot valve 24. This signal from the speed relay 3 is multiplied by a factor $$\frac{B}{A+B}$$

since the fulcrum is at point $F_2$. This is a relatively small signal to the rocker shaft 33 as compared to the signal which shaft 33 receives when the system is on the partial arc mode of operation in which the signal from the speed relay is multiplied by a factor $$\frac{B+C}{A+B+C}$$

If we assume that full arc camshaft 16 and partial arc camshaft 14 both rotate through the same angle in order to effect full opening of all valves, then the cams 15 on the partial arc camshaft must be about four times as steep as the cams 17 on the full arc camshaft, assuming four steam admission valves. Lever dimensions A, B, C can be chosen so that the ratio $$\frac{B}{A+B}$$

provides an opening signal to the partial arc servomotor 23 which is ¼ of the opening signal sent by the ratio $$\frac{B+C}{A+B+C}$$

to the full arc servomotor. In this manner, although operating in the full arc mode, the partial arc servomotor 23 receives an opening signal which is proportioned so that the partial arc cam for the #1 admission valve is lifted exactly the same amount as the corresponding full arc cam 17. Cam lever 10 for the #1 admission valve lifts exactly the same amount as corresponding cam lever 11 and the two levers share the control of link 9, servomotor 6 and seam valve 4a.

The same principle can be applied to turbines with different numbers of steam admission valves by using different cam slopes and lever ratios. The purpose of this coordination between the positions of the full arc camshaft 16 and the partial arc camshaft 14 is to effect a smooth transfer and to minimize load change when transferring from full arc to partial arc or from partial arc to full arc operation. The way in which this is accomplished can best be illustrated by going through the transfer procedure in detail.

Assume now that the transfer is being made from the full arc mode of operation to the partial arc mode. The full arc-partial arc changer mechanism is turned toward the partial arc stop 42 until the transfer pilot valve 26 is lowered to the port position shown in FIG. 2. Thus far, there is no effect. Further adjustment of the changer mechanism toward the partial arc stop 42 will now start to lower the full arc servomotor 22 as the transfer pilot valve 26 overrides the full arc pilot valve 25. As the full arc servomotor 22 moves in the closing direction, the full arc cam shaft 16 will rotate to close all control valves equally. In the restoring mechanism, link 30 will move upward pivotting about its right end of fulcrum $F_3$ which now acts as a fixed fulcrum. This input to lever 30 is multiplied by the lever ratio $$\frac{A}{A+B+C}$$

to become an opening signal to rocker shaft 33. In this manner, the partial arc servomotor is opening at the same time that the full arc servomotor is closing during the transfer. When the partial arc stop 42 is reached in the changer mechanism, the transfer pilot valve 26 is again in control, the ram of servomotor 22 being locked in its closed position. The movements of the full arc servomotor 22 and the partial arc servomotor 23 are automatically coordinated so that there is no net change in steam flow as a result of the transfer. During full arc operation the partial arc servomotor has been automatically positioned so that the first admission valve is always receiving exactly the same opening signal from both servomotors. As the full arc servomotor starts in the closing direction the second, third and fourth steam valves start to move in the closing direction. However the partial arc servomotor automatically moves the first valve further open at exactly the same time. By proper choice of ratios for levers A, B, C the partial arc servomotor will open at a rate to approximately offset the closing of the other valves.

The transfer from full arc to partial arc as above described is reversible from partial arc to full arc. These changes can be made at any load at the operator's discretion. However, operation on partial arc below 25 or 30% valve opening is not normally recommended because of possible thermal distortions already mentioned.

It will be apparent that a control system has herein been described enabling a turbine to be operated on full arc or partial arc operation by a dual control system operatively connected to a common set of control valves. In other words, this system operates by two modes of control on a single set of steam valves so that the large and expensive valve equipment in the system need not be duplicated to achieve a dual operating system. Furthermore, it will be apparent that the above described system is operable in the range from 0 to 100% load on both full arc or partial arc modes of operation.

It may occur to others of ordinary skill in the art to make modifications of the present invention which will remain within the concept and scope thereof and will not constitute a departure therefrom. Accordingly, it is intended that the invention be not limited by the details in which it has been described but that it encompass all within the purview of the following claims.

What is claimed is:

1. A steam turbine having a plurality of steam admission control valves operating in response to a signal from a speed governor, each such valve controlling admission of steam to one of several nozzle groups around the circumference of the first turbine stage, wherein the improvement comprises:

a means to control alternatively said steam admission control valves in unison or in sequence, said means comprising, a mechanism to operate each of said valves, a first means to actuate said mechanisms in unison, a second means to actuate said mechanisms in sequence, and third means to alternatively render said first means inoperative and said second means responsive to a dominant extent to said speed governor signal or to render said first means responsive to a dominant extent and said second means responsive to a subordinate extent to the same speed governor signal.

2. The improvement according to claim 1 wherein:

said mechanism comprises a lift rod signalling the opening and closing of each of said valves, each such lift rod operatively connected to a full arc and a partial arc cam lever such that the lever which effects the higher lifting of said rod controls the valve position, said first means comprises a full arc camshaft having a plurality of identically oriented cams, each in operative relationship to one of said full arc cam levers, said second means comprises a partial arc camshaft having a plurality of rotatably offset cams, each in operative relationship to one of said partial arc cam levers, and said third means comprises a servomotor operatively connected to each camshaft and transfer control means to render the servomotor connected to said full arc camshaft inoperative during one mode of operation and rendering the servomotor connected to the partial arc camshaft less effective during another mode of operation.

3. The improvement according to claim 2 wherein said transfer control means comprises:

a transfer pilot valve and a full arc pilot valve communicating with each other and with said full arc servomotor, said transfer pilot valve further communicating with a source of pressurized fluid and operable through a plurality of positions to direct such pressurized fluid to said full arc servomotor or to said full arc pilot valve, or to block the flow of said fluid, said full arc pilot valve being responsive to a signal from said speed governor to control the position of said full arc servomotor when said transfer pilot valve is directing fluid to said full arc pilot valve, a partial arc pilot valve operatively connected to said partial arc servomotor and responsive to a signal from said speed governor to control the position of said partial arc servomotor, the control by said speed governor effecting a larger total valve opening by means of said full arc servomotor than by means of said partial arc servomotor when said transfer pilot valve is directing fluid to said full arc pilot valve, the control by said speed governor effecting a larger valve opening by means of said partial arc servomotor than by means of said full arc servomotor when said transfer pilot valve is blocking fluid to said full arc pilot valve, and means to coordinate the action of said servomotors so that as one is moving in a closing direction the other is moving in an opening direction to maintain substantially constant steam flow.

4. A full arc-partial arc control system for a turbine comprising:

a full arc camshaft operatively connected to a full arc servomotor to uniformly position a plurality of steam admission control valves relative to their respective nozzle groups.

a partial arc camshaft operatively connected to a partial arc servomotor to sequentially position said steam control valves, said camshafts being alternatively in controlling relation to said valves, that camshaft calling for the larger valve opening being dominant over the other, said partial arc servomotor and said full arc servomotor being controlled by partial arc and full arc pilot valves respectively, said pilot valves being responsive to a turbine speed signal, a transfer pilot valve communicating with a source of pressurized fluid, and with said full arc pilot valve and operable through a plurality of positions to direct such pressurized fluid to said full arc pilot valve or to block the flow of said fluid, said full arc pilot valve being in control of the steam admission control valves when said transfer pilot valve is directing fluid to said full arc pilot valve, and said partial arc pilot valve being in control of the steam admission control valves when said transfer pilot valve is blocking fluid flow therethrough.

5. In a steam turbine having a plurality of valves operable in response to a common valve positioning signal, each such valve having a valve-operating servo and controlling admission of steam to one of several nozzle groups around the circumference of the first turbine stage, and having a servo-operated partial arc camshaft with a plurality of angularly offset cams with follower means connected to respective valve-operating servos, the improvement comprising:

a servo-operated full arc camshaft having a plurality of cams oriented identically with respect to one another and with respect to one of the cams on said partial arc camshaft, said full arc cams also having follower means connected to said valve-operating servos, all of said full arc and partial arc follower means having lost motion means to permit the follower means calling for the greatest valve opening to actuate the respective valve operating servo, transfer means arranged to render the full arc camshaft inoperative in the partial arc mode of operation and to render a rotation of the partial arc camshaft for a given change of valve positioning signal in the full arc mode of operation.

References Cited

UNITED STATES PATENTS

| 3,026,889 | 3/1962 | Bryant | 137—18 |
| 3,097,488 | 7/1963 | Eggenberger et al. | 60—73 |
| 3,097,489 | 7/1963 | Eggenberger et al. | 60—73 |
| 3,097,490 | 7/1963 | Callan et al. | 60—73 |
| 3,226,932 | 1/1966 | Strohmeyer | 60—73 |
| 3,241,322 | 3/1966 | Strohmeyer | 60—73 |
| 3,288,160 | 11/1966 | Eggenberger et al. | 137—27 |

EVERETTE A. POWELL, JR., *Primary Examiner.*